(12) United States Patent
George et al.

(10) Patent No.: US 10,876,701 B2
(45) Date of Patent: Dec. 29, 2020

(54) PROGRAMMABLE GLARE-FREE HIGH BEAM

(71) Applicant: Flex-N-Gate Advanced Product Development, LLC, Tecumseh (CA)

(72) Inventors: Ronie George, Kentwood, MI (US); Matthew Steven Beilfuss, Muskegon, MI (US)

(73) Assignee: Flex-N-Gate Advanced Product Development, LLC, Tecumseh (CA)

(*) Notice: Subject to any disclaimer, the term of this patent is extended or adjusted under 35 U.S.C. 154(b) by 0 days.

(21) Appl. No.: 16/561,673

(22) Filed: Sep. 5, 2019

(65) Prior Publication Data

US 2020/0072434 A1    Mar. 5, 2020

Related U.S. Application Data

(60) Provisional application No. 62/727,082, filed on Sep. 5, 2018.

(51) Int. Cl.

| | |
|---|---|
| *F21S 41/675* | (2018.01) |
| *B60Q 1/14* | (2006.01) |
| *F21S 41/255* | (2018.01) |
| *F21S 41/141* | (2018.01) |
| *F21S 41/20* | (2018.01) |

(Continued)

(52) U.S. Cl.
CPC .......... *F21S 41/675* (2018.01); *B60Q 1/1415* (2013.01); *F21S 41/141* (2018.01);
(Continued)

(58) Field of Classification Search
CPC ........ F21S 41/675; F21S 41/33; F21S 41/255; F21S 41/141; F21S 41/147; F21S 41/148
See application file for complete search history.

(56) References Cited

U.S. PATENT DOCUMENTS

| | | |
|---|---|---|
| 8,602,618 B2 | 12/2013 | Ahn et al. |
| 9,581,306 B2 | 2/2017 | Yamamura et al. |

(Continued)

FOREIGN PATENT DOCUMENTS

| | | |
|---|---|---|
| DE | 102014001201 A1 | 7/2015 |
| DE | 202016105624 U1 | 12/2016 |
| RU | 2289754 C1 | 6/2005 |

OTHER PUBLICATIONS

PCT Patent Application PCT/US2019/049655 International Search Report and Written Opinion dated Jan. 9, 2020.

*Primary Examiner* — William N Harris
(74) *Attorney, Agent, or Firm* — Erise IP, P.A.

(57) ABSTRACT

A programmable glare-free high beam device onboard a vehicle includes a plurality of light sources and an input coupler for combining light from the plurality of light sources. A focusing lens is adapted to receive light emitted from the input coupler and focus the light onto a digital micro-mirror device (DMD). The DMD has a plurality of individual micro-mirrors for reflecting light received from the focusing lens. A projection lens is adapted to receive light from the DMD and to project the light to form a spot distribution of a high beam light pattern. A plurality of auxiliary optics are adapted to form a broadened distribution of the high beam light pattern. A controller is provided for adaptively controlling the plurality of LEDs, the DMD, and the plurality of auxiliary optics to actively dim or turn off portions of the high beam light pattern.

19 Claims, 9 Drawing Sheets

(51) Int. Cl.
*F21S 41/365* (2018.01)
*F21S 41/33* (2018.01)
*F21W 102/13* (2018.01)
*F21Y 115/10* (2016.01)
*G02B 27/12* (2006.01)

(52) U.S. Cl.
CPC .......... *F21S 41/255* (2018.01); *F21S 41/285* (2018.01); *F21S 41/336* (2018.01); *F21S 41/365* (2018.01); *G02B 27/12* (2013.01); *B60Q 2300/054* (2013.01); *F21W 2102/13* (2018.01); *F21Y 2115/10* (2016.08)

(56) References Cited

U.S. PATENT DOCUMENTS

| | | |
|---|---|---|
| 9,658,447 B2 | 5/2017 | Bhakta |
| 9,765,938 B2 | 9/2017 | Yagi |
| 10,443,790 B2 | 10/2019 | George et al. |
| 2005/0174771 A1* | 8/2005 | Conner ............... G02B 27/0994 362/244 |
| 2010/0208478 A1* | 8/2010 | Fang ..................... B60Q 1/085 362/466 |
| 2015/0369437 A1* | 12/2015 | Reinprecht ........... F21S 41/151 362/510 |
| 2015/0377442 A1 | 12/2015 | Bhakta et al. |
| 2015/0377446 A1* | 12/2015 | Bhakta ............... G02B 27/0933 362/510 |
| 2016/0347237 A1* | 12/2016 | Bhakta ................. F21S 41/285 |
| 2017/0003524 A1 | 1/2017 | Schaefer et al. |
| 2017/0106793 A1* | 4/2017 | Kumar .................. B60Q 1/085 |
| 2017/0314759 A1 | 11/2017 | Nykerk et al. |
| 2018/0095355 A1 | 4/2018 | Lim et al. |
| 2018/0132330 A1 | 5/2018 | Chong et al. |
| 2018/0252403 A1 | 9/2018 | Hamid et al. |
| 2018/0274745 A1 | 9/2018 | Nykerk et al. |
| 2018/0313510 A1* | 11/2018 | Albou .................. F21S 41/265 |
| 2019/0309924 A1 | 10/2019 | Nykerk et al. |

* cited by examiner

PROGRAMMABLE GLARE-FREE HIGH BEAM

CROSS-REFERENCE TO RELATED APPLICATIONS

This application claims the benefit of U.S. Provisional Application No. 62/727,082 entitled "Programmable Glare-Free High Beam" and filed on Sep. 5, 2018, which is herein incorporated by reference in its entirety.

BACKGROUND

1. Field of the Disclosure

Embodiments of this disclosure relate generally to the field of headlamp assemblies for use in vehicles. More specifically, embodiments of this disclosure relate to adaptable headlamps and digital micro-mirror device (DMD) light projection systems.

2. Description of the Related Art

Many types of adaptable headlamps for vehicles are described in the prior art. For example, U.S. Patent Publication 2015/0377442 to Bhakta et al. discloses an automotive headlamp having a DMD headlight module. U.S. Patent Publication 2018/0095355 to Lim et al. discloses a vehicle headlamp having a DMD reflection unit, a primary optical system, and an auxiliary optical system. German Patent Publication DE102014001201 to Rotscholl et al. discloses a motor vehicle headlight having a first lighting device with a DMD array and a second lighting device having a laser light source for producing a more intense beam that is modulated with an acoustic-optic deflector. U.S. Pat. No. 9,658,447 to Bhakta discloses a DMD light projection system having a plurality of light sources, an array of micro-mirrors, and a controller for controlling the micro-mirrors and light sources. U.S. Pat. No. 9,765,938 to Yagi discloses a vehicle headlamp having a light source, a projection lens and DMD light deflectors. U.S. Pat. No. 9,581,306 to Yamamura et al. discloses a vehicle headlamp having a light source, a DMD light deflector, and a tube-shaped housing having a transparent portion that thermally separates the light source from the DMD light deflector. U.S. Pat. No. 8,602,618 to Ahn et al. discloses an intelligent headlamp assembly for a vehicle having a generic light source and a prism for directing light from the light source to a DMD.

SUMMARY

In an embodiment, a programmable glare-free high beam device onboard a vehicle includes a plurality of light sources and an input coupler for combining light from the plurality of light sources. A focusing lens is adapted to receive light emitted from the input coupler and focus the light onto a digital micro-mirror device (DMD). The DMD has a plurality of individual micro-mirrors for reflecting light received from the focusing lens. A projection lens is adapted to receive light from the DMD and to shape the light for forming a high beam light pattern for the vehicle. A controller is provided for adaptively controlling the plurality of light sources and the individual micro-mirrors of the DMD to actively dim or turn off portions of the high beam.

In another embodiment, a high beam vehicle lamp includes a plurality of light-emitting diodes (LEDs) for providing a light source and an input coupler for combining light from the plurality of LEDs. A focusing lens is adapted to receive light emitted from the input coupler and focus the light. A digital micro-mirror device (DMD) adapted to reflect light received from the focusing lens. A projection lens is adapted to receive light from the DMD and to project the light to form a spot distribution of a high beam light pattern. A plurality of auxiliary optics are adapted to form a broadened distribution of the high beam light pattern. A controller is provided for adaptively controlling the plurality of LEDs, the DMD, and the plurality of auxiliary optics to actively dim or turn off portions of the high beam light pattern.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Embodiments of the present disclosure include an adaptable headlamp for a vehicle that provides a means to modulate, dim or turn off portions of the headlamp for the purpose of reducing glare as perceived by someone outside the vehicle (e.g., a passenger of another vehicle or a pedestrian). In some embodiments, a broader high beam is provided by integrating auxiliary optics within the adaptable headlamp.

Figure 1:
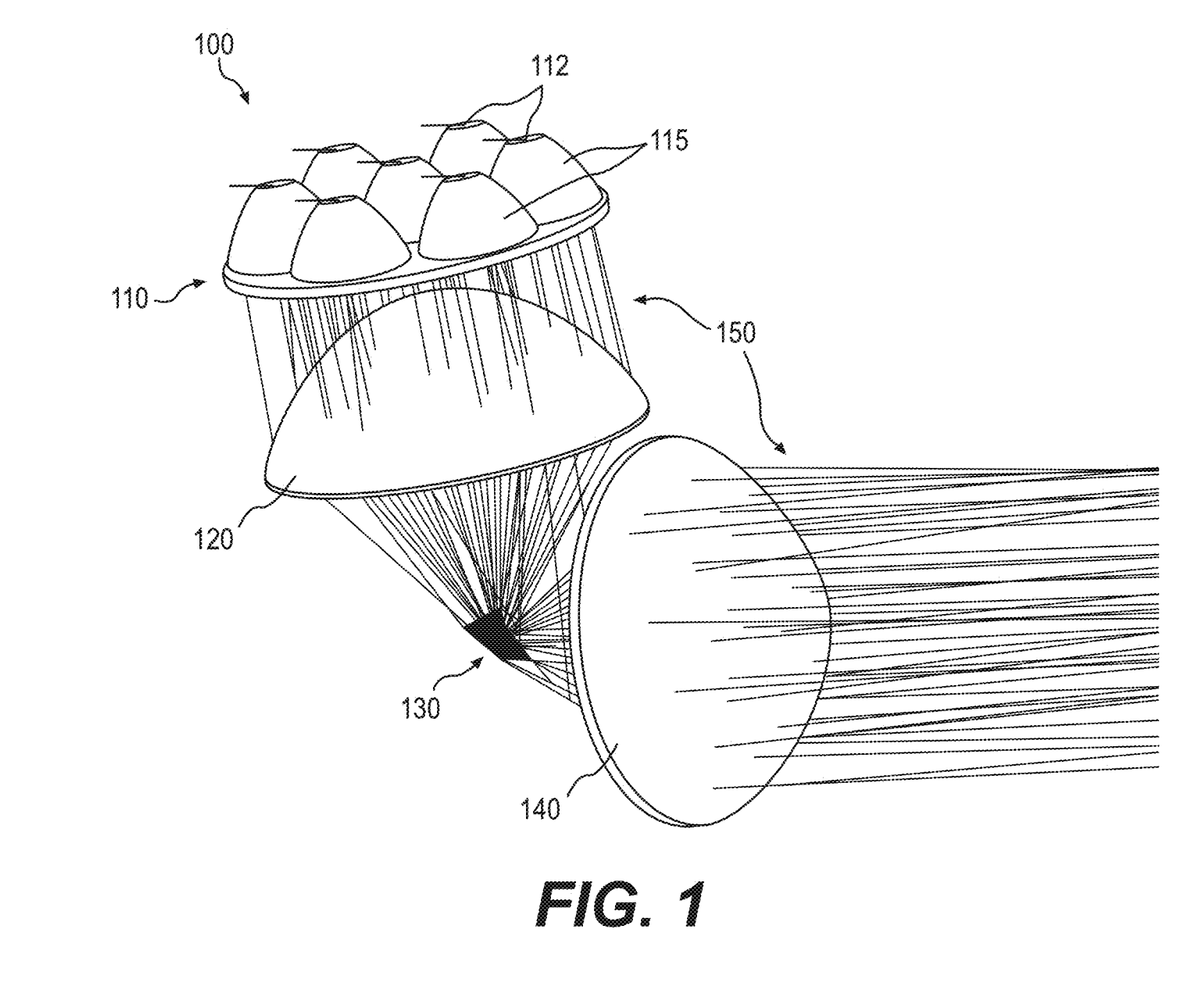
FIG. 1 depicts a programmable glare-free high beam device, in an embodiment.

FIG. 1 depicts an exemplary programmable glare-free high beam device 100. The programmable device 100 includes an input coupler 110, a focusing lens 120, a digital micro-mirror device (DMD) 130, and a projection lens 140. The input coupler 110 couples light from a plurality of light sources 112. The light sources are for example light-emitting diodes (LEDs). Each LED emits light into a respective cone-shaped refractor 115 of the input coupler 110. A focal point of each LED is aligned to coincide with a focal point of a respective cone-shaped refractor 115. As depicted in FIG. 1, seven LEDs 112 are paired with seven corresponding cone-shaped refractors 115; however, greater than or fewer than seven LEDs paired with cone-shaped refractors may be used without departing from the scope hereof. Not all light sources 112 and cone-shaped refractors 115 are enumerated for clarity of illustration.

Input coupler 110 combines light from a plurality of light sources. For example, individual beams of light from each of the plurality of light sources are collimated, and the plurality of collimated light beams are blended to form a homogenous light distribution. As depicted in FIG. 1, emitted light 150 is projected from input coupler 110 towards focusing lens 120. Focusing lens 120 is for example an asphere adapted to focus light received from input coupler 110 onto DMD 130. An asphere or aspheric lens is one whose surface differs in shape from portions of a sphere or cylinder.

DMD 130 is for example a programmable DMD having a plurality of micro mirrors that are each individually controllable. DMD 130 is adapted to receive light from focusing lens 120 and reflect the light towards projection lens 140. In certain embodiments, DMD 130 is positioned at an approximately forty-five-degree angle with respect to focusing lens 120 and projection lens 140, which folds the beam pattern to provide a compact arrangement of device 100. In some embodiments, DMD 130 includes an array of about 1.3-million mirrors contained within a physical size of about 0.5-inch by about 0.25-inch.

Figure 2:
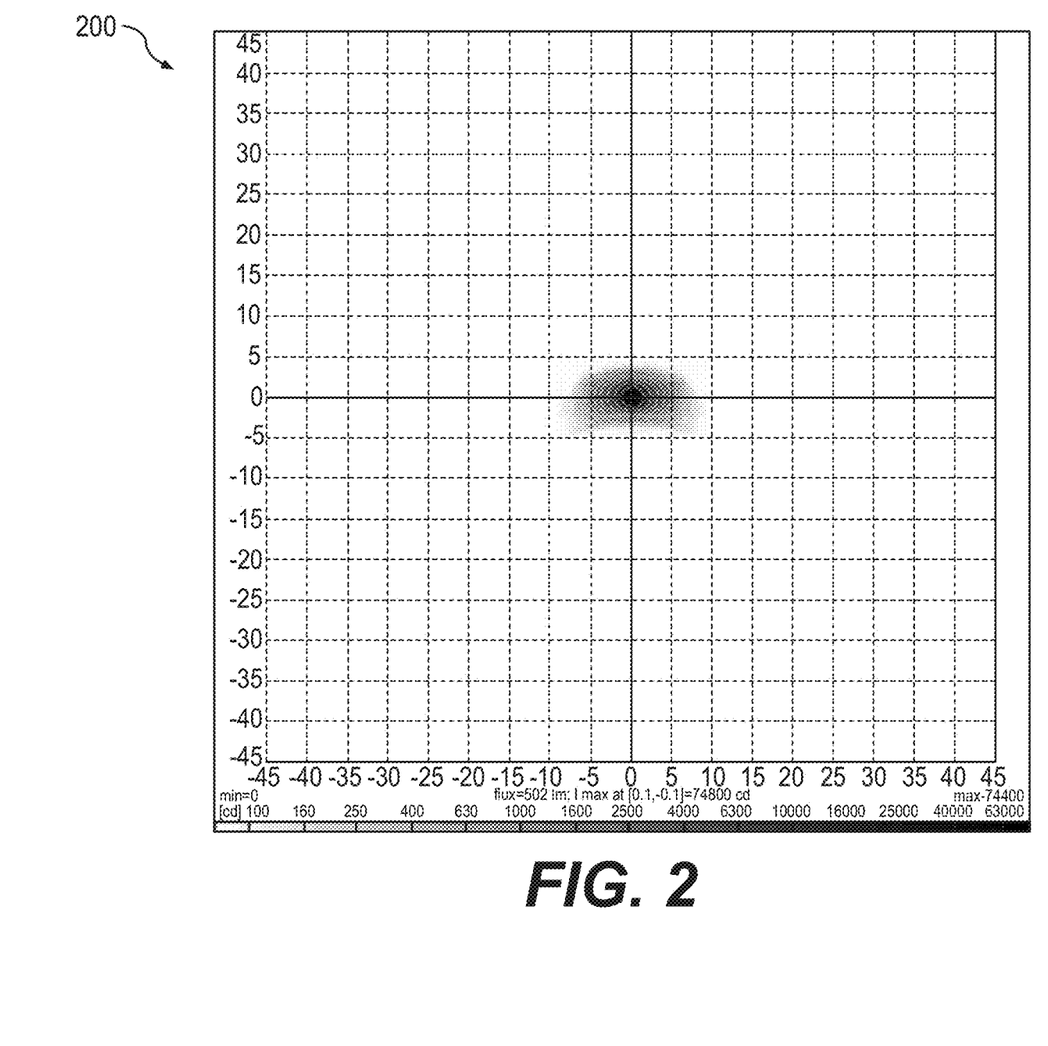
FIG. 2 is a contour plot of an exemplary spot image generated using the programmable glare-free high beam device of FIG. 1.

Projection lens 140 is an undivided freeform optic surface, an undivided aspheric, or an undivided modified aspheric surface that generates one collective undivided image. In certain embodiments, projection lens 140 is adapted to generate a collective undivided image in front of a vehicle when a full beam is lit. Projection lens 140 may image light from DMD 130 onto a road for performing at least a portion of the function of a high beam headlamp. An exemplary spot image generated by projection lens 140 is depicted in FIG. 2. To improve beam image uniformity an exit surface of projection lens 140 may include pillow optics, flutes, a swept optic surface, or it may be flat.

FIG. 2 is a contour plot 200 of an exemplary spot image generated using programmable glare-free high beam device 100, FIG. 1. The darker regions illustrate a peak light flux around the center of the plot with decreasing levels of flux further away from the center. The exemplary spot image provides a light distribution that spreads about three degrees upward and about four degrees downward in a vertical direction. This meets certain up/down spread requirements for a FMVSS108/ECE High Beam. In a horizontal direction, the spread is about seven degrees left/right. Of course, other light distributions are possible without departing from the scope hereof. With respect to a vehicle containing device 100, the horizontal direction is a side-to-side or "cross-car" direction and the vertical direction is an up/down direction.

Advantages of using DMD 130 as a reflector within programmable glare-free high beam device 100 include an ability to dim, modulate or turn off portions of the high beam for the purpose of reducing glare as perceived by someone outside the vehicle. A controller communicatively coupled with DMD 130 may be programmed for controlling individual micro mirrors of DMD 130 (see e.g., FIG. 9 and its description below).

In certain embodiments, individual micro mirrors of DMD 130 may pivot between a first mirror position and a second mirror position upon receiving a signal from the controller. In certain embodiments, the first mirror position directs light at a first angle towards projection lens 140 (as depicted in FIG. 1), while the second mirror position directs light at a second angle away from projection lens 140. The second mirror position may direct light to a light absorber (not shown) to effectively divert light away from projection lens 140. The light absorber may be formed of a non-reflective material, for example. By controlling individual micro mirrors, the resulting light beam may be shaped with a high degree of accuracy, which may be used to divert emitted light away from oncoming cars or pedestrians and towards road hazards, street signs, etc.

In certain instances, a broader high beam is desired beyond what programmable glare-free high beam device 100 provides. In certain embodiments (see e.g., FIGS. 3-6 and 10), programmable glare-free high beam device 100 is coupled with auxiliary optics adapted to compliment light emitted from projection lens 140.

Figure 3:
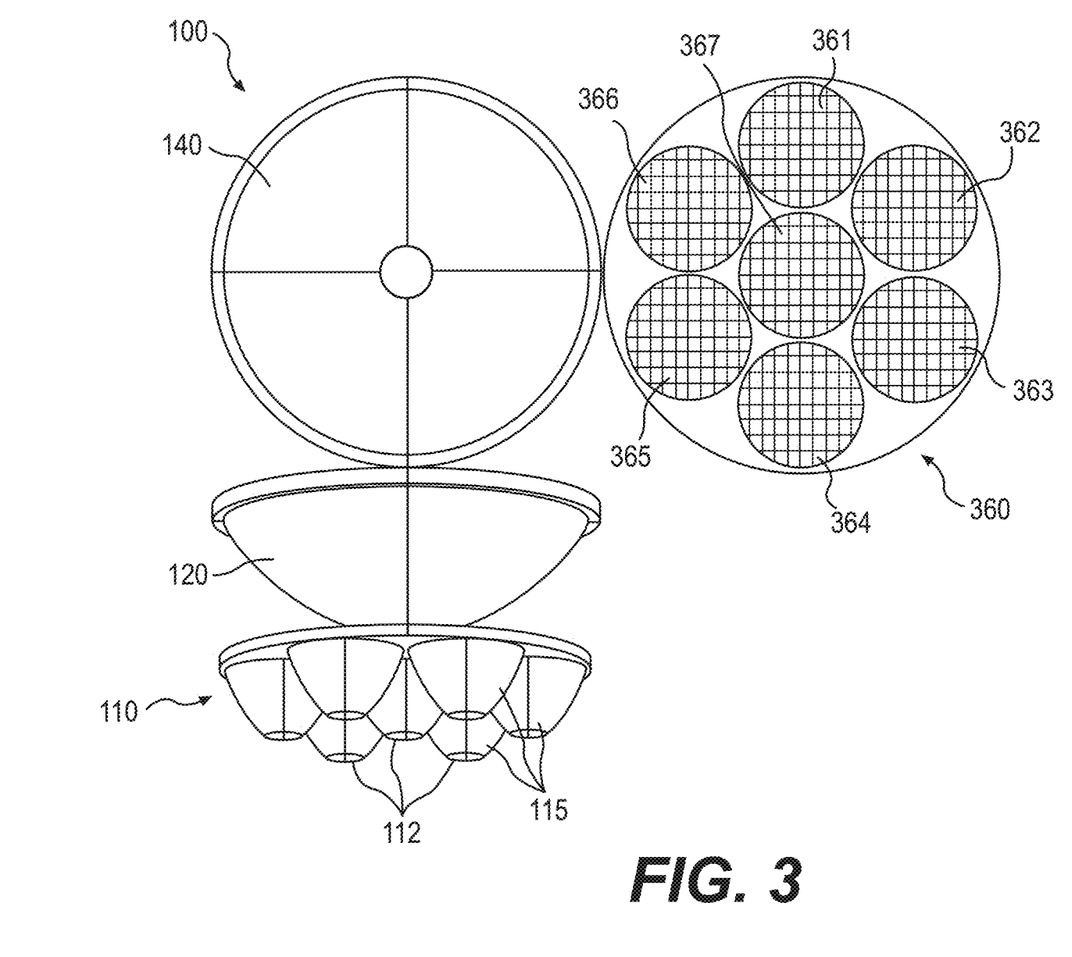
FIG. 3 depicts the programmable glare-free high beam device of FIG. 1 integrated with auxiliary optics, in an embodiment.
Figure 4:
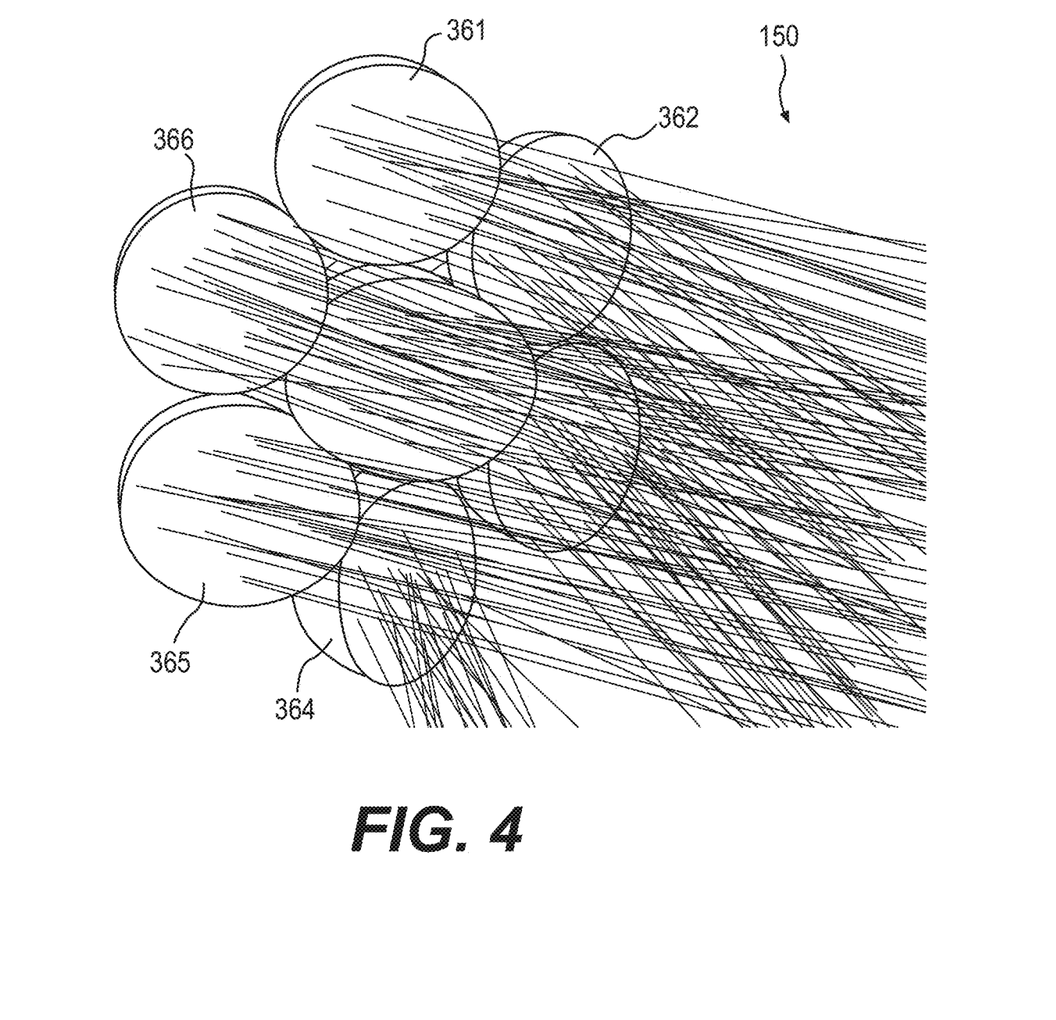
FIG. 4 depicts an emission side of the auxiliary optics of FIG. 3 tilted at various angles for projecting emitted light in corresponding various directions.
Figure 6:
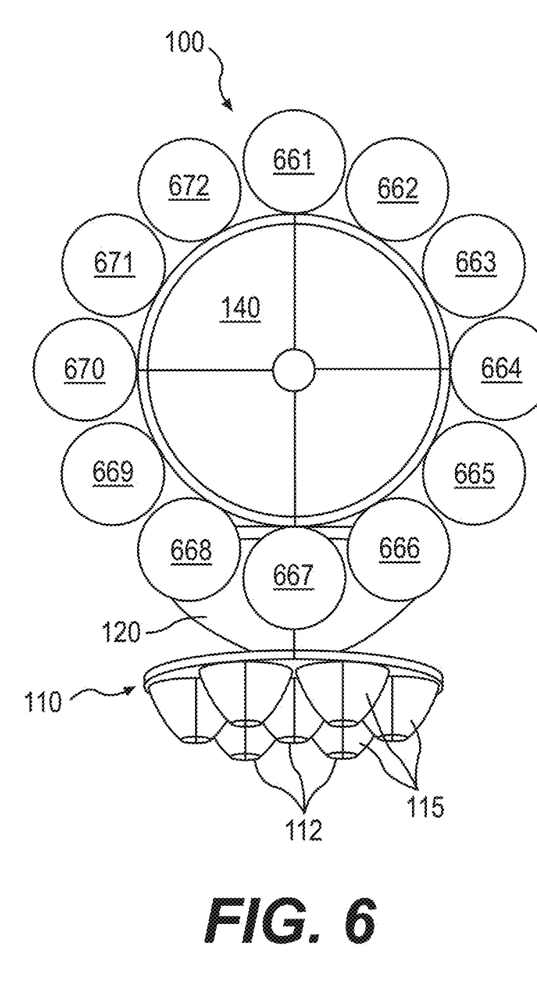
FIG. 6 depicts the programmable glare-free high beam device of FIG. 1 integrated with auxiliary optics, in an embodiment.

FIG. 3 depicts programmable glare-free high beam device 100 integrated with an auxiliary input coupler 360 having auxiliary optics 361-367. Components enumerated with like numerals from FIG. 1 are the same or similar and their descriptions are not repeated accordingly. As depicted in FIG. 3, auxiliary optics 361-367 are collectively arranged beside one another and adjacent to projection lens 140. However, alternative arrangements of the auxiliary optics are contemplated, e.g., as depicted in FIG. 6. Auxiliary optics 361-367 include a first, second, third, fourth, fifth, sixth, and seventh light source (not shown), each of which may be controlled independently by the controller. As depicted in FIG. 3, an emission side of the auxiliary optics 361-367 are viewable. In other words, the LEDs are unviewable behind auxiliary optics 361-367. In certain embodiments, input coupler 360 is an example of input coupler 110 having a plurality of LEDs as light sources each coupled with a respective cone-shaped refractor. Each of auxiliary optics 361-367 may be tilted for adjusting a direction of emitted light, as depicted in FIG. 4, under control of the controller. Auxiliary optics 361-367 are individually programmable for controlling beam shape via the controller, as further described below in connection with FIG. 9. For example, each of optics 361-367 may be tilted and the LEDs may be turned on/off, pulse-width modulated, or otherwise dimmed.

FIG. 4 depicts an emission side of auxiliary optics 361-367 tilted at various angles for projecting emitted light 150 in corresponding various directions. Each of auxiliary optics 361-367 is independently controlled via a controller, such as that shown in control architecture 900, FIG. 9.

Figure 5:
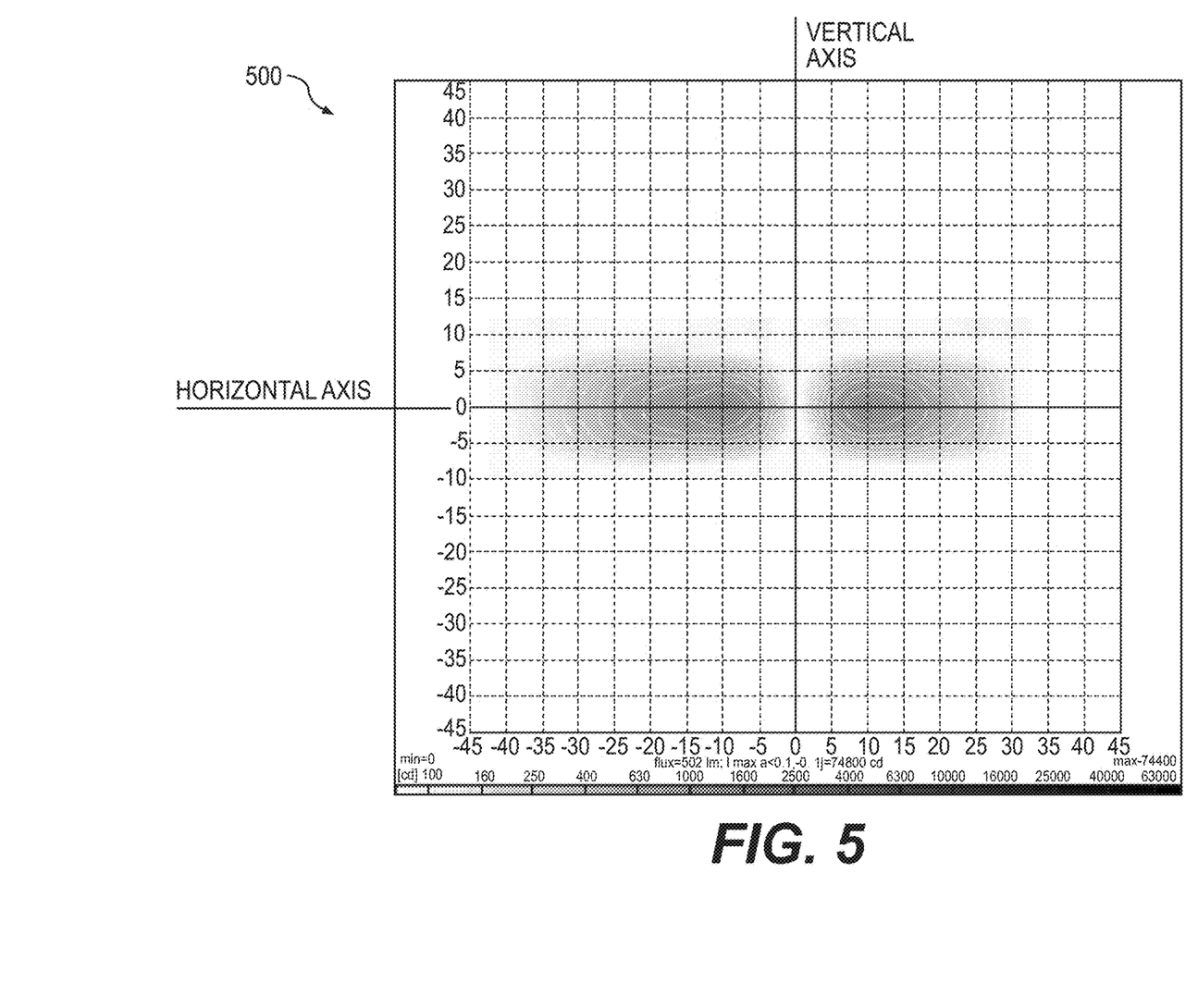
FIG. 5 is a contour plot of an exemplary spot image generated using the auxiliary optics of FIG. 3.
Figure 10:
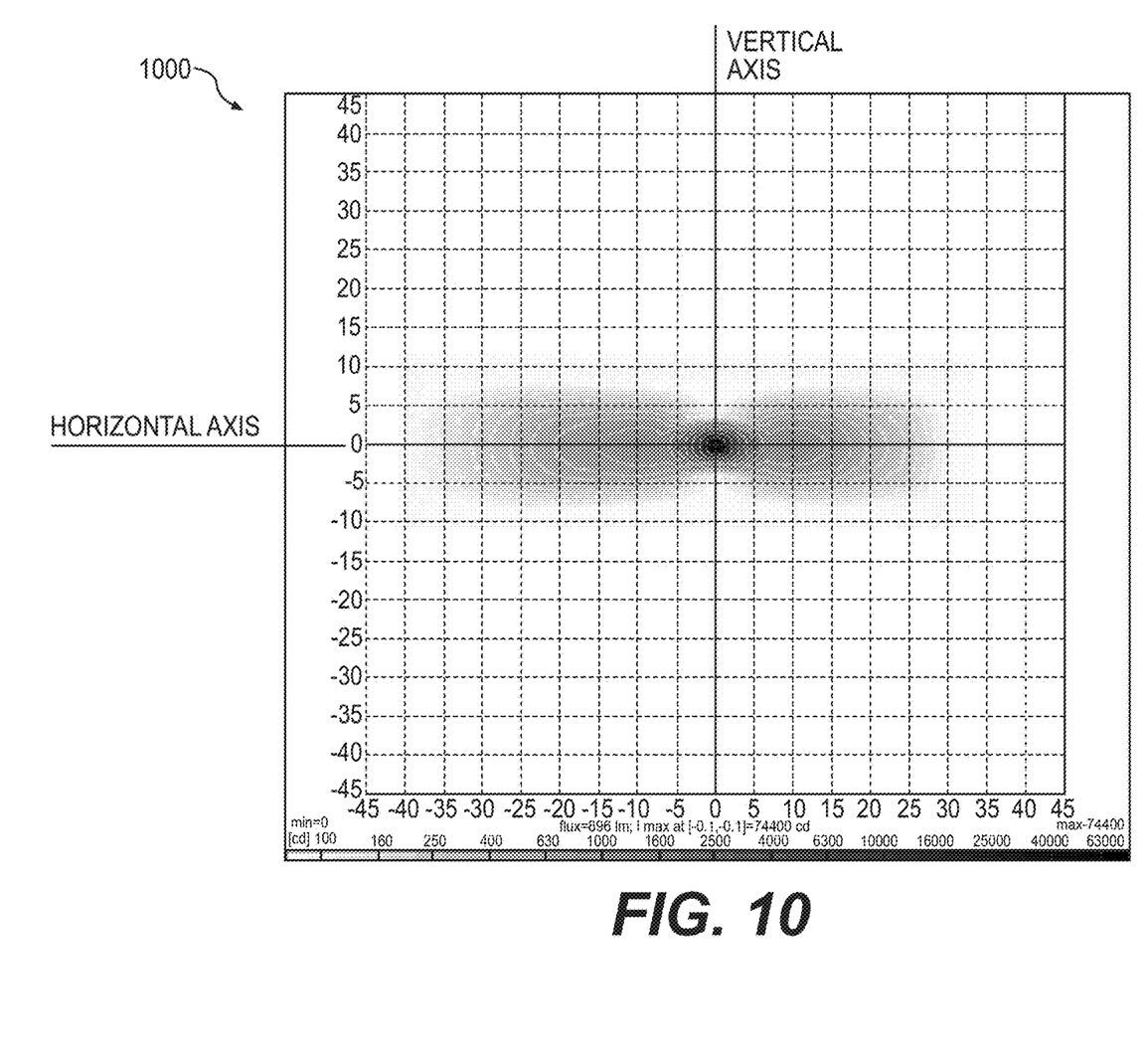
FIG. 10 is a contour plot of exemplary spot images generated using auxiliary optics in conjunction with the programmable glare-free high beam device of FIG. 1.

FIG. 5 is a contour plot 500 of exemplary spot images generated using auxiliary optics 360, FIG. 3. The contour lines illustrate levels of light flux, with darker regions corresponding to higher levels of light flux (e.g., along the horizontal axis) and lighter regions corresponding to decreasing levels of flux (e.g., with increasing distance above and below the horizontal axis). Contour plot 500 includes two exemplary spot images separated by a gap. The gap may optionally be filled in with a light beam provided by programmable glare-free high beam device 100, as depicted in FIG. 10. Alternatively, the gap may be left unilluminated to avoid producing glare in a central location.

The exemplary spot images shown in plot 500 provide a much broader light distribution compared to the spot distribution of FIG. 2. As depicted in FIG. 5, a first exemplary spot image 501 extends in the horizontal direction from about three degrees to about thirty-five degrees to the left of the vertical axis. A second exemplary spot image 502 extends in the horizontal direction from about three degrees to about thirty degrees to the right of the vertical axis. In the vertical direction, both spot images have a spread of about seven degrees above and below the horizontal axis. Of course, other light distributions are possible by controlling the tilt of individual auxiliary optics 361-367 without departing from the scope hereof.

FIG. 6 depicts programmable glare-free high beam device 100 integrated with auxiliary optics 661-672, which are examples of auxiliary optics 361-367 of FIG. 3. Components enumerated with like numerals from FIG. 1 are the same or similar and their descriptions are not repeated accordingly. Auxiliary optics 661-672 are arranged circumferentially around an outer circumference of projection lens 140 to provide an alternative arrangement compared to auxiliary optics 361-367, FIG. 3. As depicted in FIG. 6, twelve auxiliary optics are provided but greater than twelve or fewer than twelve auxiliary optics may be used without departing from the scope hereof. Auxiliary optics 661-672 are individually programmable for controlling beam shape via a controller, as further described below in connection with FIG. 9.

Figure 7:
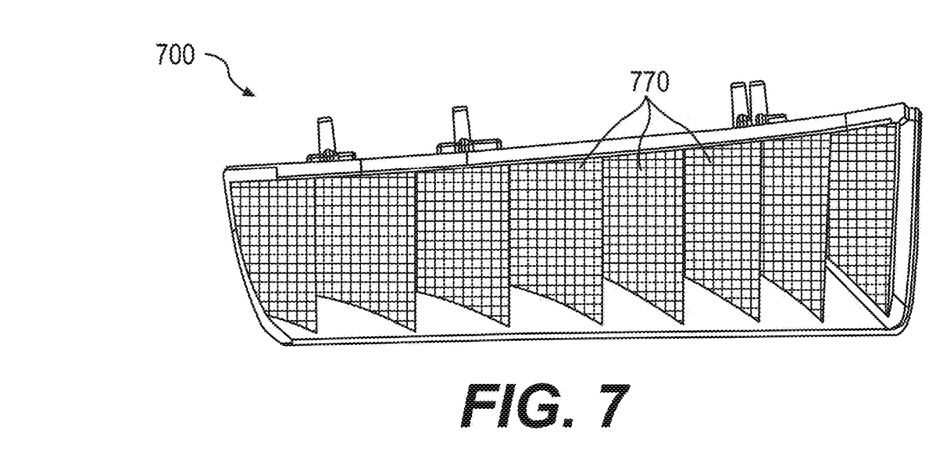
FIG. 7 depicts a rear view of auxiliary reflector optics, in an embodiment.
Figure 8:
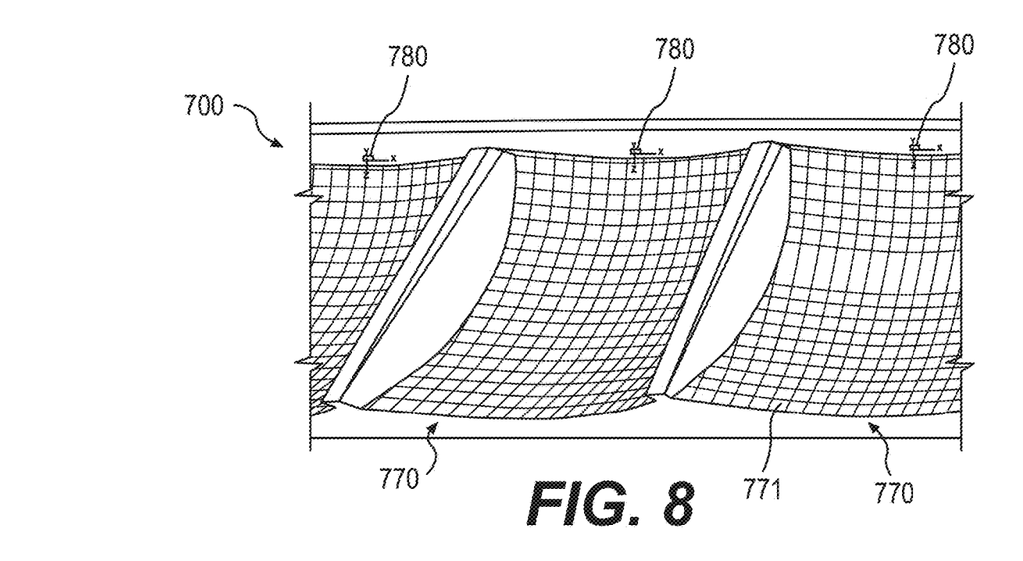
FIG. 8 depicts a side view of the auxiliary reflector optics of FIG. 7.

FIG. 7 depicts a rear view of auxiliary reflector optics 700 for integrating with programmable glare-free high beam device 100. FIG. 8 depicts a side view of auxiliary reflector optics 700. FIGS. 7 and 8 are best viewed together with the following description. In certain embodiments, auxiliary reflector optics 700 are adapted for broadening the light emitted by projection lens 140. For example, auxiliary reflector optics 700 may be used to produce the light distribution depicted in FIG. 5 without the use of auxiliary optics 361-367. Auxiliary reflector optics 700 include a plurality of reflectors 770 that are each adapted to reflect light emitted by an LED 780. In certain embodiments, reflectors 770 include a matrix of facets. A facet 771 directs light at predetermined angles (not all facets are enumerated for clarity of illustration). A focal point of each LED 780 coincides with a focal point of its respective reflector 770. In certain embodiments, reflectors 770 are indirect fire reflectors that reflect light from an LED such that the reflected light exits device 100.

Figure 9:
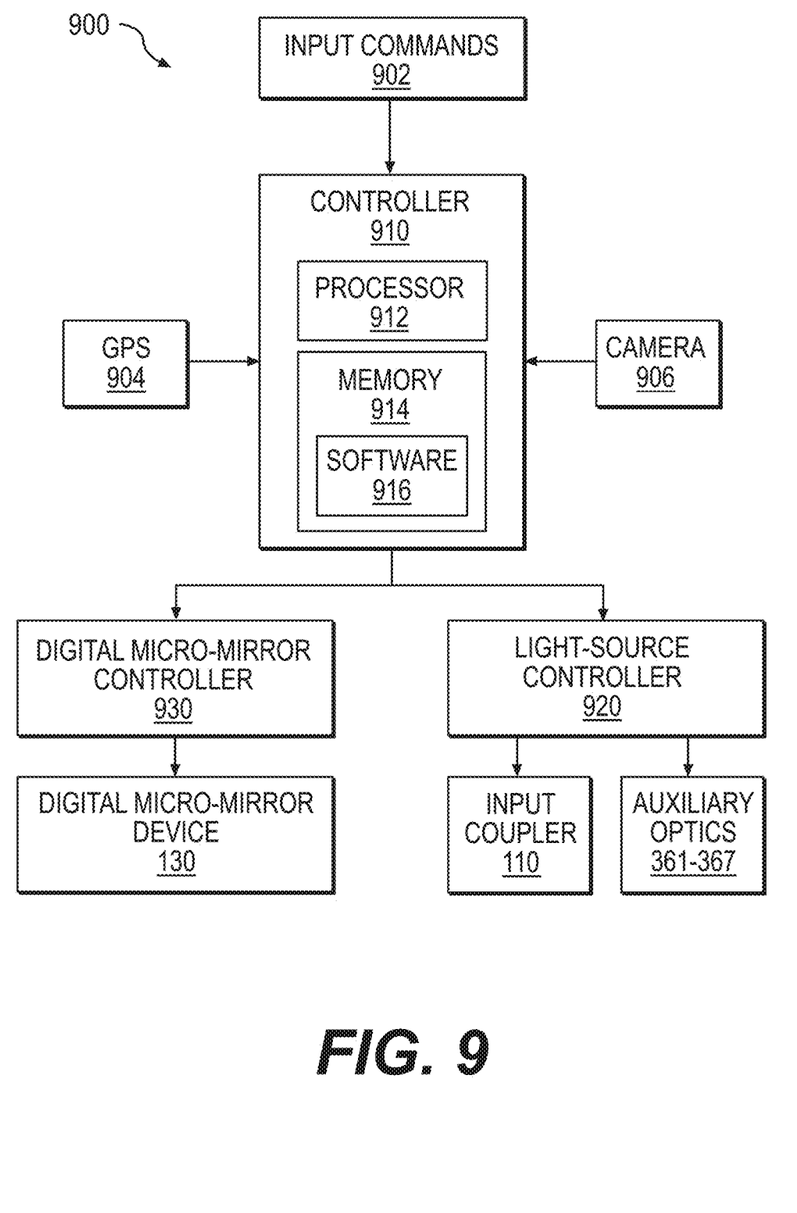
FIG. 9 is a block diagram of a control architecture for controlling the programmable glare-free high beam device, in an embodiment.

FIG. 9 is a block diagram of an exemplary control architecture 900 for controlling programmable glare-free high beam device 100 onboard a vehicle. The control architecture 900 includes a controller 910, which is for example a headlamp control module that includes one or more of a computer, a microcontroller, a microprocessor, or a programmable logic controller (PLC). In certain embodiments, controller 910 includes a memory 914, including a non-transitory medium for storing software 916, and a processor 912 for executing instructions of software 916. Memory 914 may be used to store information used by controller 910, including but not limited to algorithms, lookup tables, and computational models.

Controller 910 is communicatively coupled with a GPS module 904 and a camera 906 and is configured to receive input commands 902 from a vehicle control module or user interface. An example input command is "turn headlamp on". Communication with controller 910 may be by one of a wired and/or wireless communication media.

In certain embodiments, controller 910 is communicatively coupled with DMD 130 via a digital micro-mirror (DMD) controller 930. DMD controller 930 is for example an integrated microchip that receives input from controller 910 and controls positioning of individual micro-mirrors of DMD 130.

In some embodiments, controller 910 is communicatively coupled with input coupler 110 and auxiliary optics (e.g., auxiliary optics 361-367, FIG. 3 or auxiliary optics 661-672, FIG. 6) via a light-source controller 920. Light-source controller 920 is for example an integrated microchip that receives feedback from controller 910 and may individually turn on or off individual LEDs (or arrays of LEDs) to block light in angular sections. For example, when controller 910 determines that an oncoming car is in an angular section ahead of the headlamp within seven to ten degrees, LEDs assigned to light up that area may be turned off. Light-source controller 920 may include one or more switches for performing pulse-width modulation, which may be used to effectively dim light emitted from certain LEDs.

In operation, controller 910 processes information from GPS module 904 and camera 906 for determining which light sources to turn off or modulate, and for determining which micro-mirrors to adjust position for diverting light, in real-time or near real-time based on information received from at least one of the GPS module 904 and camera 906. For example, controller 910 may dim certain LEDs of auxiliary optics 361-367 or auxiliary optics 661-672 using pulse-width modulation. In certain embodiments, radar information may also be provided to controller 910 for determining which light sources to turn off or modulate, and for determining which micro-mirrors to adjust position for diverting light.

FIG. 10 is a contour plot 1000 of exemplary spot images generated using auxiliary optics 360, FIG. 3 in conjunction with programmable glare-free high beam device 100, FIG. 1. The contour lines illustrate levels of light flux, with darker regions corresponding to peak levels and decreasing levels of flux above and below the horizontal axis. In other words, contour plot 1000 combines the spot images of FIG. 2 with the spot images of FIG. 5. Similarly, auxiliary optics 661-672, FIG. 6 may be used in conjunction with device 100, FIG. 1 to produce the exemplary spot images in contour plot 1000.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A programmable glare-free high beam device onboard a vehicle, comprising:
   a plurality of light sources;
   an input coupler for combining light from the plurality of light sources;
   a focusing lens adapted to receive light emitted from the input coupler and focus the light onto a digital micro-mirror device (DMD), the DMD having a plurality of individual micro-mirrors for reflecting light received from the focusing lens;
   a projection lens adapted to receive light from the DMD and to shape the light for forming a high beam light pattern for the vehicle;
   a controller for adaptively controlling the plurality of light sources and the individual micro-mirrors of the DMD to actively dim or turn off portions of the high beam; and a plurality of auxiliary optics adapted to generate a collective undivided image in front of a vehicle when a full beam is lit and compliment the light emitted from the projection lens for broadening a shape of a high beam light pattern.

2. The programmable glare-free high beam device of claim 1, wherein the plurality of light sources comprises a plurality of light-emitting diodes (LEDs).

3. The programmable glare-free high beam device of claim 1, wherein the input coupler comprises a plurality of cone-shaped refractors that each receive light from a respective one of the plurality of light sources, the input coupler being adapted to collimate light from the plurality of light sources, wherein a focal point of each one of the plurality of light sources is aligned to coincide with a focal point of a respective one of the plurality of cone-shaped refractors.

4. The programmable glare-free high beam device of claim 1, wherein the DMD is positioned at an approximately forty-five-degree angle with respect to the focusing lens and with respect to the projection lens thereby folding the beam pattern to provide a compact arrangement.

5. The programmable glare-free high beam device of claim 1, wherein each of the plurality of auxiliary optics comprises a LED and a cone shaped refractor for shaping light from the LED such that a homogenous light distribution is formed from the plurality of auxiliary optics.

6. The programmable glare-free high beam device of claim 1, wherein each LED of the plurality of auxiliary optics is independently controlled by the controller to actively dim or turn off portions of a broadened high beam light pattern.

7. The programmable glare-free high beam device of claim 1, wherein each of the plurality of auxiliary optics is individually tiltable under control of the controller for adjusting a direction of emitted light thereby controlling a shape of a broadened high beam light pattern.

8. The programmable glare-free high beam device of claim 1, wherein the plurality of auxiliary optics are arranged circumferentially around an outer circumference of the projection lens.

9. The programmable glare-free high beam device of claim 1, wherein the plurality of auxiliary optics are collectively arranged beside one another and adjacent to the projection lens.

10. The programmable glare-free high beam device of claim 1, wherein the controller is adapted to modulate, dim, or turn off one or more of the plurality of light sources, one or more of the individual micro-mirrors of the DMD, and one or more of the plurality of auxiliary optics for the purpose of reducing glare as perceived outside the vehicle.

11. The programmable glare-free high beam device of claim 1, further comprising a camera communicatively coupled to the controller such that the controller adaptively controls the plurality of light sources, the DMD, and the auxiliary optics based on information received from the camera.

12. A programmable glare-free high beam device onboard a vehicle, comprising:
a plurality of light sources;
an input coupler for combining light from the plurality of light sources;
a focusing lens adapted to receive light emitted from the input coupler and focus the light onto a digital micro-mirror device (DMD), the DMD having a plurality of individual micro-mirrors for reflecting light received from the focusing lens;
a projection lens adapted to receive light from the DMD and to shape the light for forming a high beam light pattern for the vehicle;
a controller for adaptively controlling the plurality of light sources and the individual micro-mirrors of the DMD to actively dim or turn off portions of the high beam; and
a plurality of reflector optics adapted for broadening the light emitted by the projection lens, wherein each of the plurality of reflector optics comprises a LED and a reflector having a matrix of facets adapted to reflect light from the LED, with each facet of the matrix of facets being adapted to direct light at a predetermined angle.

13. A high beam vehicle lamp, comprising:
a plurality of light-emitting diodes (LEDs) for providing a light source;
an input coupler for combining light from the plurality of LEDs;
a focusing lens adapted to receive light emitted from the input coupler and focus the light;
a digital micro-mirror device (DMD) adapted to reflect light received from the focusing lens;
a projection lens adapted to receive light from the DMD and to project the light to form a spot distribution of a high beam light pattern;
a plurality of auxiliary optics adapted to form a broadened distribution of the high beam light pattern; and
a controller for adaptively controlling the plurality of LEDs, the DMD, and the plurality of auxiliary optics to actively dim or turn off portions of the high beam light pattern.

14. The high beam vehicle lamp of claim 13, wherein the projection lens and the plurality of auxiliary optics are collectively adapted to generate an undivided image in front of a vehicle.

15. The high beam vehicle lamp of claim 13, further comprising a GPS module and a camera communicatively coupled to the controller such that the controller adaptively controls the plurality of LEDs, the DMD, and the auxiliary optics based on information received from at least one of the GPS module and the camera.

16. The high beam vehicle lamp of claim 13, wherein the plurality of auxiliary optics are arranged circumferentially around an outer circumference of the projection lens.

17. The high beam vehicle lamp of claim 13, wherein the plurality of auxiliary optics are collectively arranged separately from the projection lens.

18. The high beam vehicle lamp of claim 13, further comprising a plurality of reflector optics adapted for broadening the light emitted by the projection lens, wherein each of the plurality of reflector optics comprises a light source and a reflector having a matrix of facets adapted to reflect light from the light source.

19. The high beam vehicle lamp of claim 18, wherein a focal point of the light source is aligned to coincide with a focal point of a respective reflector, and each facet of the matrix of facets is adapted to direct light at a predetermined angle.

* * * * *